(12) United States Patent
Diena et al.

(10) Patent No.: US 9,441,067 B2
(45) Date of Patent: Sep. 13, 2016

(54) PROCESS FOR MAKING LONG FIBER-REINFORCED POLYURETHANES THAT CONTAIN PARTICULATE FILLERS

(75) Inventors: Paolo Diena, Modena (IT); Luigi Bertucelli, Reggio Emilia (IT); George A. Klumb, Novi, MI (US); Gianluca Casagrande, Castlefranco Emilia (IT)

(73) Assignee: Dow Global Technologies LLC, Midland, MI (US)

(*) Notice: Subject to any disclaimer, the term of this patent is extended or adjusted under 35 U.S.C. 154(b) by 320 days.

(21) Appl. No.: 13/578,150

(22) PCT Filed: Mar. 11, 2011

(86) PCT No.: PCT/EP2011/053731
§ 371 (c)(1),
(2), (4) Date: Aug. 9, 2012

(87) PCT Pub. No.: WO2011/113768
PCT Pub. Date: Sep. 22, 2011

(65) Prior Publication Data
US 2012/0328775 A1 Dec. 27, 2012

(30) Foreign Application Priority Data
Mar. 18, 2010 (IT) .............................. MI2010A0440

(51) Int. Cl.
C08G 18/10 (2006.01)
C08G 18/32 (2006.01)
C08G 18/48 (2006.01)
C08G 18/66 (2006.01)
C08G 18/76 (2006.01)

(52) U.S. Cl.
CPC ............ C08G 18/6674 (2013.01); C08G 18/10 (2013.01); C08G 18/3206 (2013.01); C08G 18/4841 (2013.01); C08G 18/7664 (2013.01); C08G 2120/00 (2013.01)

(58) Field of Classification Search
CPC .............. C08G 18/6674; C08G 18/10; C08G 18/3206; C08G 18/4841; C08G 18/7664; C08G 2120/00

USPC .................. 524/261, 590; 264/500, 571, 257
See application file for complete search history.

(56) References Cited

U.S. PATENT DOCUMENTS

| 4,863,994 A | 9/1989 | Nelson et al. |
| 5,504,179 A * | 4/1996 | Meiners et al. ................. 528/49 |
| 6,761,953 B2 | 7/2004 | Haas et al. |
| 7,638,197 B2 | 12/2009 | Haas et al. |
| 2003/0104168 A1* | 6/2003 | Shane ........................... 428/141 |
| 2005/0170189 A1 | 8/2005 | Haas et al. |
| 2005/0280173 A1 | 12/2005 | Wirtz et al. |
| 2007/0098997 A1 | 5/2007 | Younes et al. |
| 2007/0160793 A1 | 7/2007 | Cageao et al. |
| 2008/0132611 A1* | 6/2008 | Brown ........................... 524/65 |
| 2010/0297427 A1 | 11/2010 | Schlingloff et al. |

FOREIGN PATENT DOCUMENTS

| DE | 10244284 A1 | 4/2004 |
| DE | 10244287 A1 | 4/2004 |
| WO | 2009/150010 A1 | 12/2009 |

OTHER PUBLICATIONS

Author unknown, "Dow Polyurethanes—Functionality, OH Number, and Equivalent Weight Definitions", Definition of Equivalent "Weight" from Dow Answer Center, (http://dowac.custhelp.com/app/answers/detaila_id/13359/~/dow-polyurethanes---functionality,-oh-number,-and-equivalent-weight-definitions), updated Dec. 13, 2014.*
Odian, George, Principles of Polymerization, Third Edition, 1991, pp. 19-24.*
PCT/EP2011/053731 International Preliminary Report on Patentability.
PCT/EP2011/053731 International Search Report and Written Opinion.

* cited by examiner

Primary Examiner — Patrick Niland

(57) ABSTRACT

Fiber-reinforced polyurethane structures are made with a polyol composition that contains a particulate filler such as calcium carbonate, in addition to the fibers. The polyol composition and the polyisocyanate composition are selected such that the polymer formed in their reaction has a calculated molecular weight between crosslinks ($M_c$) of from 300 to 420. The polyisocyanate component contains a urethane-modified MDI and/or a urethane-modified polymeric MDI.

11 Claims, No Drawings

PROCESS FOR MAKING LONG FIBER-REINFORCED POLYURETHANES THAT CONTAIN PARTICULATE FILLERS

This invention relates to a process for making long fiber-reinforced polyurethanes that also contain a particulate filler.

Processes for producing polyurethanes reinforced with chopped fibers are becoming increasingly common. In some instances, these methods are supplanting incumbent technologies like reinforced reaction injection molding (RRIM) and structural reaction injection molding (SRIM), which use very short fibers or fiber mats, respectively, to provide reinforcement. These processes also can allow reinforced polyurethanes to replace other materials such as SMC. The processes are very well adapted for producing composites that include a show surface that is backed with a reinforced polyurethane structural layer. These composites may be used, for example, as body panels in automobiles, trucks and various types of watercraft.

In these processes, chopped fibers are dispensed together with a curable polyurethane composition onto a form or onto a mold. The polyurethane composition wets the fibers, and the wetted mass then contacts the form or mold, where it cures. The fibers are sometimes supplied to the process in the form of a continuous roving. In that case, the roving is chopped into discrete lengths immediately before being wetted with the polyurethane composition. In some processes, the chopped fiber is brought into a chamber in close proximity with the mixing head, where a polyol composition and a polyisocyanate composition are mixed to form the curable polyurethane composition. The fibers and polyurethane composition are then dispensed tougher from the mixhead onto the form. In other cases, the fibers and polyurethane composition are sprayed separately, but into each other, so the sprayed fibers become wetting as they travel towards the surface of the form or mold.

Cycle times are important to the economics of these processes, as shorter cycle times can lead to higher production rates and higher mold utilization. It is desirable to reduce cycle time as much as possible, consistent with producing a product of acceptable quality. Therefore, on-mold curing times are desired to be as short as possible. However, if cycle times are too short, the polyurethane composition may not cure adequately, which can lead to a loss of glass transition temperature and a diminishment of physical and/or thermal properties.

One specific problem that is sometimes seen is a tendency for the product to blister when exposed to temperatures in the range of 80 to 100° C. This can be a significant problem for parts which experience high service temperatures, such as those which surround the engine compartment of an automobile or a water craft. This problem is especially acute if the polyurethane composition contains a particulate filler (in addition to the fibers).

The blistering problem can be resolved by using long on-mold curing times, or by postcuring the parts, but neither of these solutions is economically viable. A solution which does not require long on-mold curing times or postcuring the parts is needed.

This invention is a two-part curable polyurethane or polyurethane-urea-forming formulation that includes a polyol component and a polyisocyanate component, wherein the polyol component includes at least one polyol and at least one particulate filler and the polyisocyanate component includes a urethane group-containing MDI or polymeric MDI, wherein (1) the particulate filler constitutes from about 10 to 60% by weight of the curable formulation and (2) the calculated molecular weight between crosslinks of the cured curable composition is from about 300 to 420.

This invention is also a process for making molded fiber-reinforced polyurethane or polyurethane-urea composites, comprising dispensing fibers that are wetted with a curable polyurethane and/or polyurea-forming formulation onto a form or mold and then curing the curable formulation on the form or in the mold to form a cured polyurethane or polyurethane-urea polymer reinforced with the fibers, wherein the curable formulation is formed by mixing a polyol component that includes at least one polyol and at least one particulate filler and a polyisocyanate component that includes a urethane group-containing MDI or polymeric MDI, and further wherein (1) the particulate filler constitutes from about 10 to 60% by weight of the curable formulation and (2) the calculated molecular weight between crosslinks of the cured polyurethane or polyurethane-urea is from 300 to 420.

The polyurethane composition used in this process cures rapidly on the form or mold to form a fiber-reinforced polyurethane or polyurethane-urea that has good physical and thermal properties, in particular a resistance to blistering when exposed to temperatures in the range of 80 to 100° C. In addition, the composite tends to have good surface appearance. These results are surprising, as the presence of urethane groups in the MDI and/or polymeric MDI usually has little or no effect on polymer crosslink density, which might account for an improved resistance to blistering. The presence of urethane groups in the MDI and/or polymer MDI also has little effect on its reactivity.

The curable composition includes a polyol component and a polyisocyanate component. The polyol component includes one or more polyol materials as described more fully below. The polyisocyanate component includes an MDI or polymeric MDI, which is modified to contain urethane groups. The isocyanate-reactive constituents of the polyol component are selected together with the isocyanate compounds in the polyisocyanate component, and together with the isocyanate index, such that the calculated molecular weight between crosslinks in the cured polymer is from 300 to 420, preferably from 350 to 400. The calculated molecular weight between crosslinks takes into account the functionality (number of isocyanate or isocyanate-reactive groups per molecule) and equivalent weight of the polyisocyanates and isocyanate-reactive materials, together with the isocyanate index, as follows:

$$M_c = \frac{W_{pol} + W_{iso}}{\frac{W_{pol}(F_{pol} - 2)}{E_{pol} \times F_{pol}} + \frac{W_{iso,stoic}(F_{iso} - 2)}{E_{iso} \times F_{iso}} + \frac{W_{iso,excess}(F_{iso} - 1)}{E_{iso}(F_{iso} + 1)}}$$

where:

$M_c$ is the calculated molecular weight between crosslinks;

$W_{pol}$ is the weight in grams of all isocyanate-reactive materials in the polyol component. $W_{pol}$ includes the weight of water or other isocyanate-reactive blowing agent.

$W_{iso}$ is the weight in grams of all polyisocyanate compounds that are used to prepare the polyisocyanate component.

$F_{pol}$ is the number average functionality (number of isocyanate-reactive groups) per molecule of isocyanate-reactive compounds in the polyol component. Water is included in this calculation and is assumed to have a functionality of two. Nominal functionalities are used for purposes of this calculation.

$E_{pol}$ is the average equivalent weight, per isocyanate-reactive group, of all isocyanate-reactive materials in the polyol component. The calculation of $E_{pol}$ takes into account the water or other isocyanate-reactive blowing agent.

$W_{iso,stoic}$ is the weight of the polyisocyanate compounds when the isocyanate index is 100 or less. If the isocyanate index is above 100, $W_{iso,stoic}$ is the weight of the polyisocyanate compounds which are needed to provide an isocyanate index of 100, i.e., one equivalent of isocyanate groups per equivalent of isocyanate-reactive groups in the polyol component.

$E_{iso}$ is the average equivalent weight, per isocyanate group, of all polyisocyanate compounds in the polyisocyanate component.

$F_{iso}$ is the number average functionality (number of isocyanate groups per molecule) of polyisocyanate compounds in the polyisocyanate component.

$W_{iso,excess}$ is the weight of the polyisocyanate compounds, if any, in excess of that needed to provide an isocyanate index of 100.

As indicated by the foregoing formula, crosslinking forms as a result of the presence of polyol and/or isocyanate compounds that have a functionality of greater than 2, and/or an isocyanate index greater than 1. Most typically, the isocyanate-reactive materials contained in the polyol component will in the aggregate have an average functionality of greater than 2.0, preferably at least 2.5 and more preferably at least 2.8. The polyisocyanate compounds contained in the isocyanate component typically will have an average isocyanate functionality of at least 2.0, preferably at least 2.3 and more preferably at least 2.5.

The polyol component therefore includes at least one polyol that has at least three hydroxyl, primary amino and/or secondary amino groups per molecule. This polyol preferably has an equivalent weight of from 31 to about 160 per hydroxyl and/or primary or secondary amino group. This polyol preferably has an equivalent weight from 31 to 120 and more preferably from 31 to 100. A mixture of these polyols can be used.

Examples of polyols of the type just described include glycerine, trimethylolpropane, trimethylolethane, pentaerythritol, sorbitol, sucrose, diethanolamine, monoethanolamine, triethanolamine, alkoxylates (especially ethoxylates and/or propoxylates) of any of the foregoing, and polyesters having an average of at least three hydroxyl groups per molecule, in each case having an equivalent weight as described above. Preferred polyols include glycerine; ethoxylates, and propoxylates of glycerine; trimethylolpropane; ethoxylates and propoxylates of trimethylolpropane having an equivalent weight of up to 120, especially up to 100, and polyester polyols formed in the reaction of a dicarboxylic acid (or anhydride) with trimethylolpropane and/or a mixture of trimethylolpropane with ethylene glycol and/or diethylene glycol.

It is also possible to include a higher equivalent weight polyol in the polyol component. This higher equivalent weight polyol may have an equivalent weight of from 161 up to 2000. It preferably has an equivalent weight of from 1000 to 1800. This higher equivalent weight polyol may contain as few as two and as many as about 8 hydroxyl, primary amino and/or secondary amino groups per molecule. Examples of polyols of this type include polyester polyols and, preferably, polyether polyols. A polyether polyol of this type may be a homopolymer of propylene oxide, a random copolymer of propylene oxide and up to 30% by weight ethylene oxide, or an ethylene oxide-capped poly(propylene oxide).

The higher equivalent weight polyol, if present preferably constitutes at most 50%, more preferably from 5 to 35%, and still more preferably from 15 to 35% of the total weight of the polyols in the polyol component.

In the aggregate, the polyols in the polyol component preferably have an average equivalent weight of from 60 to 200, more preferably from 65 to 120 and still more preferably from 70 to 100 and a functionality of from 2.5 to 3.2.

The polyol component also contains a particulate filler. The "filler" here is different than the fiber in that it has an aspect ratio of less than 3.0 and preferably less than 2.0. The filler is in the form of particles which preferably have a longest dimension of from 50 nm to 1 mm. The filler particles more preferably have a longest dimension of from 1 microns to 500 microns. The filler particles are made of an inorganic or organic material which is thermally stable (i.e., does not undergo a change in physical state or engage in chemical reactions) at the processing temperatures encountered during the curing step. Examples of suitable fillers include calcium carbonate, talc, wollastonite, various clays, ground glass, carbon black, titanium dioxide, iron oxide, aluminum hydroxide, magnesium hydroxide and the like. Calcium carbonate is a preferred filler.

The amount of the particulate filler is from 10 to 60% of the combined weights of the polyol component and the polyisocyanate component. A preferred amount is from 10 to 50%.

The polyol component may contain various optional ingredients. These include a blowing agent, a silicone surfactant, a wetting agent, one or more reaction catalysts, and the like.

The blowing agent is preferably water, which reacts with isocyanate groups to release carbon dioxide gas, and/or another compound which generates carbon dioxide under the curing conditions. Examples of such other compounds include certain carbamates and bicarbonate/citric acid mixtures. Water is preferred. It suitably constitutes from 0.25 to 2 weight percent of the polyol composition, less the particulate filler.

The silicone surfactant, if present, is suitably an organosilicone type. A wide variety of organosilicone surfactants are useful, including those sold by Momentive Performance Materials under the Niax™ trade name or those sold by Evonik under the trade name Tegostab™, or those sold by Air Products under the Dabco™ tradename. Specific examples include Niax™ L-6900, Tegostab™ B 1048 B-8462, B8427, B8433 and B-8404 and Dabco™ DC-193, DC-198, DC-5000, DC-5043 and DC-5098 surfactants. It suitably constitutes up to about 2.5 percent of the weight of the polyol composition, less the particulate filler. A preferred amount is from 0.25 to 1.5 percent.

A wetting agent is a preferred ingredient in the polyol component, as the presence of the wetting agent can significantly reduce viscosity of the fully formulated polyol component, after the addition of fillers. Suitable wetting agents include certain acidic polyester and ammonium salts of acidic copolymers, as sold by BykUSA under the trade names BYK W985 and BYK W969. Wetting agents are generally useful in amounts ranging from about 0.25 to 3, preferably from 0.5 to 2 weight percent of the particulate filler. It is preferred that the viscosity of the polyol component, including the particulate filler, is no greater than 100,000 mPa·s at 23° C. A preferred viscosity is no greater than 50,000 mPa·s at 23° C.

Suitable catalysts include tertiary amine compounds and organometallic compounds, especially tin carboxyates and tetravalent tin compounds. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N'N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis (3-dimethylaminopropyl)N-isopropanolamine, (N,N-dimethyl) amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl (aminoethoxyethyl))((dimethyl amine)ethyl)ether, tris (dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 2 parts by weight per 100 parts by weight of polyol or polyol mixture.

The polyisocyanate component includes methane diphenyldiisocyanate (MDI) and/or a polymeric MDI, at least some of which has been modified to contain urethane groups. By "polymeric MDI", it is meant a mixture of MDI with polymethylene polyphenylisocyanates that contain at least three phenylisocyanate groups. A polymeric MDI may have an isocyanate content from 26 to 32% by weight and an isocyanate functionality from 2.1 to about 3.0. The MDI may be either the 2,4'- or the 4,4'-isomer, or a mixture of both. The MDI may be modified with carbodiimide, uretonimine or biuret linkages. For example, so-called "liquid MDI" products, which have uretonimine linkages and an isocyanate equivalent weight of about 140-150 can be used as the MDI component.

The MDI and/or polymeric MDI is modified to contain urethane groups. This is done by reacting a polyol with an excess of the MDI and/or polymeric MDI. The polyol suitably has an equivalent weight from 31 to 2000, preferably from 60 to 500 and more preferably from 60 to 160, and can contain from 2 to 8, preferably from 2 to 3 hydroxyl groups per molecule. Mixtures of polyols can be used. Examples of suitable polyols for this purpose include ethylene glycol, diethylene glycol, triethylene glycol, propylene glycol, dipropylene glycol, tripropylene glycol, glycerine, trimethylolpropane, trimethylolethane, pentaerythritol, sorbitol, sucrose, alkoxylates (especially ethoxylates and/or propoxylates) of any of the foregoing, and polyesters having an average of at least two, preferably from 2 to 3, hydroxyl groups per molecule.

It is sufficient to modify only a small proportion of the MDI and/or polymeric MDI molecules to contain urethane groups. As few as about 2 mole percent of the polyisocyanate molecules may contain urethane groups. It is preferred that at least 3 mole percent of the polyisocyanate molecules contain urethane groups Although as many as 100 mole-percent of the polyisocyanate molecules may be modified to contain urethane groups, it is preferred that no more than about 25 mole-percent, more preferably no more than about 15 mole-percent of the polyisocyanate compounds contain urethane groups.

It is often convenient to introduce urethane groups into only a portion of the MDI and/or polymeric MDI, and to blend the resulting urethane-modified MDI and/or polymeric MDI with additional MDI and/or polymeric MDI. Thus, for example, MDI can be reacted with a polyol to produce a urethane group-containing intermediate, which is then blended with more MDI and/or polymeric MDI. This is a convenient way to prepare a polyisocyanate mixture that contains only a small proportion of urethane-modified molecules. A preferred isocyanate mixture is an MDI modified with urethane groups blended with polymeric MDI.

The polyisocyanate compounds in the polyisocyanate component preferably have, in the aggregate, an isocyanate content of from 23 to 32 weight percent, preferably from 25 to 30 weight percent, and an average functionality of from 2.3 to 3.0 isocyanate groups per molecule, preferably from 2.5 to 2.8 isocyanate groups per molecule.

An especially preferred polyisocyanate is prepared by reacting MDI or a "liquid" MDI with a diol such as dipropylene glycol or tripropylene glycol to an isocyanate content of about 20-27%, and then diluting the resulting prepolymer with polymeric MDI to an isocyanate content of from 25 to 30 weight percent and an average functionality of from 2.5 to 2.8 isocyanate groups per molecule.

The polyisocyanate component optionally contains an organosilicone surfactant. The surfactant suitably constitutes from 0.25 to 5, preferably from 0.5 to 2.5 percent of the total weight of the polyisocyanate component. Suitable organosilicone surfactants include those described before.

A composite is made in accordance with the invention by mixing the polyol component and the polyisocyanate component to form a curable composition, wetting fibers with the curable composition and dispensing the wetted fibers onto a form or into a mold where the curable composition is cured.

The weight ratio of fibers to the curable composition suitable is such that the composite contains from about 10 to about 50% by weight of the fibers.

The fibers can be of any material that is thermally and chemically stable under the conditions of the curing reaction. Glass fibers are generally preferred on the basis of cost and availability, but boron fibers, carbon fibers, high-melting polymeric fibers and the like are all useful. The fibers may be coated if desired with a sizing, a coupling agent or other useful coating. The lengths of the fibers are suitably from about ¼ inch (0.6 cm) to 12 inches (30 cm). A preferred length is from 1 to 4 inches (2.54 to 10.2 cm).

The wetting and dispensing functions can be performed by bringing the polyol component, polyisocyanate component and fibers together and dispensing the resulting curable mixture onto a form or into a mold. The curable composition wets the fibers in the mixhead or en route to the form or mold surface, so that the fibers are at least partially wetted with the curable composition before they reach the surface of the form or mold.

The polyol and polyisocyanate components are suitably mixed at ratios sufficient to provide an isocyanate index of from about 80 to about 300. A preferred isocyanate index is at least 100 and no greater than 150. An especially preferred isocyanate index is from 100 to 125.

The wetted fibers can be dispensed by pouring or spraying. In a pouring process, the wetted fibers are simply poured or injected onto the surface of the form or mold. In a spraying process, the fibers and the curable composition are sprayed onto the form or mold. In some embodiments, the fibers and the curable composition are sprayed separately but simultaneously, the direction of the sprays being such that the fibers become wetted as they travel toward the mold or form. In these cases, a gas stream can used to propel the fibers into the curable composition exiting the mixhead. Alternatively the fibers and curable composition can be brought together within a mixhead and sprayed out together. In either case, the fibers become wetted by the curable composition and then are brought into contact with the form or mold.

A preferred type of mixhead includes a high pressure impingement mixer, by which the polyol and polyisocyanate components are brought into contact and rapidly mixed and brought into contact with the fibers. The fibers can be supplied in the form of continuous rovings which are chopped into the desired lengths immediately before being introduced into the mixhead. Mixheads of these types are commercially available. They include the "LFI" mixheads that are available from Krauss-Maffei.

Once the wetted fibers are applied to the form or mold, the curable composition is cured to form a polyurethane or polyurethane-urea polymer. It is usually desirable to performing the curing step at an elevated temperature, such as from 50 to 120° C. The form or mold together with the applied wetted fibers is in that case heated together to the curing temperature. It is common to preheat the form or mold to the curing temperature. The material is cured on the form or in the mold long enough that it can be demolded without permanent deformation or damage to the part. Both closed-mold curing and open-mold curing are possible. The curing step generally requires from 0.5 to 20 minutes, depending on the particular formulation (including the selection and amount of catalyst) and the curing temperature. If a blowing agent is present in the curable composition, the curing composition will expand during the curing step and form a cellular composite.

The process of the invention is suitable for producing multi-layer structures. It is often desirable to produce parts which have a very smooth and/or colored show surface. This can be done in accordance with the invention by first applying a powder coating, in-mold paint, thermoplastic film and/or gel coating composition to the surface of the form or mold, and then dispensing wetted fibers onto the form or mold as described above. A powder coating, in-mold paint and/or gel coat can be cured simultaneously or sequentially with the curing of the curable composition of the invention, depending on the time allowed to elapse between the application of the various layers onto the form or mold. In a simultaneous cure, curing conditions in this case are selected to permit both layers to cure.

A show surface also can be applied after the curable composition of this invention is cured, using techniques such as high-pressure injection in-mold coating processes or via common, post-demold painting or coating methods.

It is also possible to introduce additional layers into the multilayer structure, in addition to or in place of the powder coating, in-mold paint, thermoplastic film and/or gel coating. For example, one or more additional layers can be interposed between a show surface layer and the fiber-reinforced polyurethane or polyurethane-urea layer. Alternately or in addition, one or more additional layers can be applied atop the fiber-reinforced polyurethane and/or polyurethane-urea layer.

A specific multilayer composite of interest includes a show surface which may be a cured powder coating, a cured in-mold paint, a thermoplastic film or a cured gel coating; a substantially non-cellular barrier layer atop the show surface, and a fiber reinforced, optionally cellular, polyurethane or polyurethane-urea layer atop the barrier layer. Either or each of the barrier layer and the fiber reinforced polyurethane or polyurethane-urea layer may be applied in accordance with the invention.

As before, all layers in any such multi-layer structures can be cured simultaneously or sequentially.

The process is suitable for producing parts such as automobile and truck body panels, hulls of boats and personal watercraft; all-terrain vehicle bodies; windsurfing boards, golf cart bodies; electronics housings, and the like. The good thermal stability of the fiber-reinforced polyurethane or polyurethane-urea polymer makes the parts useful even in applications in which they will be exposed regularly to temperatures as high as 100° C. Therefore, the parts are useful in and around engine compartments of vehicles such as personal watercraft, ATVs, automobiles and the like.

Inadequate thermal stability in the composite can manifest itself by blistering when the composite is exposed to elevated temperatures. Blistering is believed to be caused by the generation and/or release of gasses within the composition when exposed to elevated temperatures. The propensity for a composite to blister can be evaluated by immersing the composite in 80° C. water for 100 hours. The presence of blisters or bubbles is evaluated by visually inspecting the surface of the composite.

The composition of the invention is surprisingly resistant to blistering on this test. For reasons that are not well understood, the presence of urethane groups in the polyisocyanate component has been found to contribute very significantly to blistering resistance on this test. This phenomenon is not easily explained. The presence of these urethane groups does not lead to large changes in isocyanate functionality, isocyanate equivalent weight or $M_c$. Furthermore, the small changes that can result from the selection of the urethane-modified polyisocyanate would be expected to increase Mc, rather than decrease it. Increasing $M_c$ is normally expected to make the composite less resistant to high temperatures; therefore the improved resistance to blistering is quite unexpected.

The following examples are provided to illustrate the invention but are not intended to limit the scope thereof. All parts and percentages are by weight unless otherwise indicated.

EXAMPLES 1-4 AND COMPARATIVE SAMPLES A-E

Two polyol components are formed by blending the ingredients indicated in Table 1.

TABLE 1

| Ingredient | Polyol Component A | Polyol Component B |
|---|---|---|
| Polyol Mixture 1[1] | 96.8 | 0 |
| Polyol Mixture 2[2] | 0 | 96.7 |
| Silicone surfactant | 1.00 | 1.00 |
| Water | 0.70 | 0.80 |
| Wetting agent[3] | 0.00 | 1.00 |
| Amine catalyst[4] | 1.50 | 1.50 |
| CaCO$_3$ | Variable | Variable |
| Hydroxyl number, blend | 662 | 699 |

[1]A mixture of short-chain triols and a 3000 MW ethylene oxide-capped poly(propylene oxide)diol. The mixture has an average functionality of 2.87 and a hydroxyl number of 662.
[2]A mixture of short-chain triols and a 3000 MW ethylene oxide-capped poly(propylene oxide)diol. The mixture has an average functionality of 2.86 and equivalent hydroxyl number of 693.
[3]BYK W969, from BYK USA.
[4]A mixture of tertiary amine catalysts in a glycerine/ethylene glycol carrier. This mixture has an equivalent weight of 38.5 per isocyanate-reactive group and an average functionality of about 2.

In addition, two isocyanate components are prepared. Polyisocyanate component A is a polymeric MDI having a viscosity of about 200 mPA·s at 25° C. and containing 31% isocyanate groups. It has an isocyanate equivalent weight of 135.5 and an isocyanate functionality of 2.7. Polyisocyanate component B is a mixture of 79 parts of a polymeric MDI having an isocyanate functionality of about 2.85 and a viscosity of about 600 mPA·s at 25° C., and containing 30.3% isocyanate groups, 20 parts of a prepolymer of MDI and tripropylene glycol containing 23.3% isocyanate groups, and 1 part of a silicone surfactant. Exclusive of the surfactant, Polyisocyanate component B has an isocyanate equivalent weight of approximately 145.4 and an average isocyanate functionality of about 2.6.

Composite parts are made from Polyols A and B and Polyisocyanate components A and B, as indicated below, by processing them through a Krauss-Maffei Rimstar RS1640 LFI Modula machine equipped with an LFI MK 30/36 mixhead. This equipment brings glass rovings to the mixhead and chops them into specified lengths (1 inch (2.54 cm) or 4 inches (10 cm)) before wetting the glass with the polyol and polyisocyanate components. The glass is P5249 from Saint Gobain. The machine is equipped with a piston-type polyol dosing unit to handle the filled polyols and with a pump-type dosing unit to handle the unfilled polyols. The polyol and polyisocyanate component temperatures are 22-25° C. Isocyanate index is 110 in all cases. The mixture produced in the mixhead is poured onto a preheated (80° C.) mold suitable to produce 3-mm thick parts having a large planar surface, and cured at 80° C. Demold time is 10 minutes, except for Comparative Sample A, where it is 5 minutes.

The formulations evaluated in this manner are as follows:

TABLE 2

| Example/Comp. Sample No. | % CaCO$_3$ | % Fiber glass/length (cm) | Polyol Component | Polyisocyanate Component | M$_c$ |
|---|---|---|---|---|---|
| A* | 0 | 30/2.5 | A | A | 376 |
| B* | 20 | 30/2.5 | A | A | 376 |
| C* | 40 | 30/2.5 | A | A | 376 |
| D* | 20 | 30/2.5 | B | A | 372 |
| E* | 20 | 30/10 | B | A | 372 |
| 1 | 20 | 30/2.5 | B | B | 395 |
| 2 | 40 | 30/2.5 | B | B | 395 |
| 3 | 40 | 30/10 | B | B | 395 |
| 4 | 40 | 40/10 | B | B | 395 |

After the composites are demolded and cooled to room temperature, larger samples are cut from each of them for thermal stability testing. Samples from each composite are immersed in 80° C. water for 100 hours. The samples are then removed from the water and visually inspected for blistering. Additional samples are heated in an oven at 100° C. for 8 hours and visually inspected for blistering. Further samples are aged at 35° C. and 95% relative humidity for 10 days, and the heated in an over at 100° C. for 1 hour. Results are indicated in Table 3.

TABLE 3

| Example/Comp. Sample No. | Hot water test | 100° C./1 hr oven | Humid aged samples (100° C./1 hr oven) |
|---|---|---|---|
| A* | No blisters | No blisters | Good surface |
| B* | No blisters | No blisters | Very minor blistering |
| C* | Blisters | No blisters | Blisters |
| D* | Blisters | No blisters | Blisters |
| E* | Blisters | Blisters | Blisters |
| 1 | No blisters | No blisters | Very minor blistering |
| 2 | No blisters | No blisters | No blisters |
| 3 | No blisters | No blisters | No blisters |
| 4 | No blisters | No blisters | N/D |

The results in Table 3 show the effect of the particulate filler and of the polyol/isocyanate selection on thermal stability. Comparative Sample A contains no particulate filler and does not blister under any of the test conditions. Comparative Sample B contains only 20% by weight of the particulate filler, and performs well on all tests except the oven test after humid aging, in which some blistering is seen. When the amount of filler is increased to 40% in Comparative Sample C, more blistering is seen. Each of Comparative Samples A-C is made using Polyol Component A and Polyisocyanate Component A.

Comparative Samples D and E each contain 20% of the particulate filler. They are comparable to Comparative Sample B, except in these instances the polyol component is Polyol Component B. The change in the polyol component from Comparative Sample B to Comparative Sample D actually increases blistering somewhat. The longer fibers in Comparative Sample E also increase blistering.

Examples 1-4 all are made using Polyol Component B and Polyisocyanate Component B. Example 1 contains 20% of the particulate filler and is directly comparable to Comparative Samples B and D. It performs similarly at the somewhat low loading of particulate filler, despite having a slightly higher M$_c$ value.

Example 2 includes 40% of the particulate filler and 30% of the fiber glass, and is comparable to Comparative Sample C. The difference Example 2 and Comparative Sample C is the selection of polyol component (B vs. A) and polyisocyanate component (B vs. A). Whereas Comparative Sample C showed significant blistering in some of the tests, Example 2 does not blister at all on any of the tests. This result is attributed to the selection of Polyisocyanate Component B. Whereas Polyol Component B by itself tends to worsen the performance on these tests (compare Comparative Sample D with Comparative Sample B), very good results are obtained when Polyol Component B is combined with Polyisocyanate Component B in Example 2.

In Example 3, the fiber glass length is increased to 10 cm. Increasing the fiber length has been seen to lead to increased blistering (compare Comparative Sample E with Comparative Sample D). However Example 3 performs equivalently to Example 2. The selection of Polyol Component B together with Polyisocyanate Component B therefore is effective even under the more stringent condition of longer fiber length.

The fiber content is increased to 40% in Example 4, still with good results on the blistering evaluations.

Mechanical and thermal properties are measured on samples cut from each of Comparative Samples A-E and Examples 1-4. Results are as indicated in Table 4.

TABLE 4

| Example/Comp. Sample No. | Flexural Modulus, MPa[1] | Charpy Impact energy, kJ/m[2] | T$_g$, ° C.[2] | Storage Modulus[2], 80° C., MPa |
|---|---|---|---|---|
| A* | 8864 | 81.8 | 153 | 6621 |
| B* | 9890 | 80.2 | 143 | 4961 |

TABLE 4-continued

| Example/Comp. Sample No. | Flexural Modulus, MPa[1] | Charpy Impact energy, kJ/m²[2] | $T_g$, °C[2] | Storage Modulus[2], 80° C., MPa |
|---|---|---|---|---|
| C* | 11,574 | 107.1 | 150 | 6886 |
| D* | 8968 | 64.1 | 155 | 5822 |
| E* | 9885 | 99.1 | 151 | 5343 |
| 1 | 9762 | 66.8 | 172 | 7623 |
| 2 | 11,175 | 45.5 | 170 | 8549 |
| 3 | 10,660 | 87.4 | 172 | 9665 |
| 4 | 14,256 | 119.8 | 171 | 10,908 |

[1] UNI EN ISO 178.
[2] $T_g$ and storage modulus are measured by DMA using a UNIVERSAL V 4.5A TA Instruments device operated at a frequency 1 Hz, and a heating rate 3° C./min. $T_g$ is the peak of the tan δ curve.

This data shows that there is a large and significant increase in the glass transition temperature with the examples of the invention. This increase is both large and unexpected, as the change in the polyisocyanate component is, if anything predicted to have a slight negative effect on glass transition temperature, due to the slight increase in $M_c$. Similarly, storage modulus at high temperature increases very substantially, and no significant cost in flexural modulus or impact strength.

The invention claimed is:

1. A process for making a fiber-reinforced polyurethane or polyurethane-urea composite, comprising wetting fibers 2.54 to 10.2 cm in length with a curable polyurethane and/or polyurea-forming formulation and dispensing the wetted fibers onto a form or mold and then curing the curable formulation on the form or in the mold to form a cured polyurethane or polyurethane-urea polymer reinforced with the fibers, wherein the curable formulation is formed by mixing a polyol component that includes at least one polyol and at least one particulate filler having an aspect ratio of less than 2.0 and longest dimension of 50 nm to 1 mm and a polyisocyanate component that includes a urethane group-containing MDI or polymeric MDI that contains MDI and polymethylene polyphenylisocyanates that contain at least three phenylisocyanate groups, and further wherein (1) the particulate filler constitutes from about 10 to 60% by weight of the curable formulation and (2) the calculated molecular weight between crosslinks of the cured polyurethane or polyurethane-urea is from about 350 to 400, wherein the calculated molecular weight between crosslinks is determined according to the formula $$M_c = \frac{W_{pol} + W_{iso}}{\frac{W_{pol}(F_{pol}-2)}{E_{pol} \times F_{pol}} + \frac{W_{iso,stoic}(F_{iso}-2)}{E_{iso} \times F_{iso}} + \frac{W_{iso,excess}(F_{iso}-1)}{E_{iso}(F_{iso}+1)}}$$

where:
$M_c$ is the calculated molecular weight between crosslinks;
$W_{pol}$ is the weight in grams of all isocyanate-reactive materials in the polyol component;
$W_{iso}$ is the weight in grams of all polyisocyanate compounds that are used to prepare the polyisocyanate component;
$F_{pol}$ is the number average functionality per molecule of isocyanate-reactive compounds in the polyol component;
$E_{pol}$ is the average equivalent weight, per isocyanate-reactive group, of all isocyanate-reactive materials in the polyol component;
$W_{iso,stoic}$ is the weight of the polyisocyanate compounds when the isocyanate index is 100 or less and when the isocyanate index is greater than 100, the weight of the polyisocyanate compounds which are needed to provide an isocyanate index of 100;
$E_{iso}$ is the average equivalent weight, per isocyanate group, of all polyisocyanate compounds in the polyisocyanate component;
$F_{iso}$ is the number average functionality of polyisocyanate compounds in the polyisocyanate component;
$W_{iso,\ excess}$ is the weight of the polyisocyanate compounds, if any, in excess of that needed to provide an isocyanate index of 100.

2. The process of claim 1, wherein the polyisocyanate component includes an organosilicone surfactant.

3. The process of claim 1, wherein the polyols in the polyol component have average equivalent weight of from 65 to 120 and a functionality of from 2.5 to 3.2.

4. The process of claim 3, wherein the polyol component includes from 0.25 to 2 weight percent of water.

5. The process of claim 4, wherein the polyol component includes a wetting agent.

6. The process of claim 2, wherein the polyisocyanate compounds in the polyisocyanate component in the aggregate have an isocyanate content 25 to 30 weight percent and an average functionality of from 2.3 to 3.0 isocyanate groups per molecule.

7. The process of claim 6, wherein the polyisocyanate component includes a mixture of a urethane-modified MDI and a polymeric MDI that contains MDI and polymethylene polyphenylisocyanates that contain at least three phenylisocyanate groups.

8. The process of claim 7, wherein from 3 to 25 mole-percent of the polyisocyanate compounds in the polyisocyanate component are urethane-modified.

9. A process of claim 8, wherein the curable composition is cured on the form or in the mold at a temperature of from 50 to 120° C.

10. The process of claim 1, wherein a powder coating, in-mold paint, thermoplastic film or gel coating composition is applied to the surface of the form or mold, the wetted fibers are sprayed onto the powder coating, in-mold paint, thermoplastic film or gel coating composition, or onto another layer applied on top of the powder coating, in-mold paint, thermoplastic film or gel coating composition, and the curable composition is cured to form a multilayer structure that includes a layer of a cured powder coating, cured in-mold paint, thermoplastic film or cured gel coating composition.

11. The process of claim 10, wherein the wetted fibers are sprayed onto a layer of powder coating, in-mold paint or gel coating composition, or onto another layer applied on top of the powder coating, in-mold paint or gel coating composition, and the curable composition is cured simultaneously with the powder coating, in-mold paint or gel coating composition.

* * * * *